United States Patent [19]

Hsieh

[11] Patent Number: 4,642,299

[45] Date of Patent: Feb. 10, 1987

[54] SILICON NITRIDE HAVING LOW DIELECTRIC LOSS

[75] Inventor: Martin Y. Hsieh, Palo Alto, Calif.

[73] Assignee: GTE Products Corporation, Stamford, Conn.

[21] Appl. No.: 749,329

[22] Filed: Jun. 27, 1985

Related U.S. Application Data

[63] Continuation-in-part of Ser. No. 721,118, Apr. 8, 1985.

[51] Int. Cl.$^4$ .................... C04B 35/58; H01Q 1/42
[52] U.S. Cl. .................... 501/97; 343/872; 501/98; 501/152
[58] Field of Search .................... 501/97, 98, 152; 75/233; 343/872

[56] References Cited

U.S. PATENT DOCUMENTS

| | | | |
|---|---|---|---|
| 4,025,351 | 5/1977 | Masaki | 501/98 |
| 4,147,911 | 4/1979 | Nishitani | 264/25 |
| 4,327,187 | 4/1982 | Komatsu et al. | 501/98 |
| 4,358,772 | 11/1982 | Leggett et al. | 343/872 |
| 4,407,970 | 10/1982 | Komatsu et al. | 501/98 |
| 4,511,402 | 4/1985 | Miura et al. | 75/233 |
| 4,521,525 | 6/1985 | Hsieh | 501/97 |
| 4,552,851 | 11/1985 | Hsieh | 501/98 |

*Primary Examiner*—Helen M. McCarthy
*Attorney, Agent, or Firm*—James Theodosopoulos

[57] ABSTRACT

A composition having a low dielectric constant and low dielectric loss tangent from room temperature to at least about 1100° C. comprises a silicon nitride based material containing an effective amount of a sintering aid and an effective amount of a low dielectric loss promoter.

2 Claims, No Drawings

SILICON NITRIDE HAVING LOW DIELECTRIC LOSS

This application is a continuation-in-part of Ser. No. 721,118, filed 4/8/85.

FIELD OF THE INVENTION

This invention relates to a silicon nitride composition having a low dielectric constant and a low dielectric loss over a wide temperature range. More particularly it relates to a silicon nitride material containing an effective amount of certain sintering aids and an effective amount of a low dielectric loss promoter.

BACKGROUND OF THE INVENTION

In radome window applications of dielectric materials, it is desirable to have materials with the following dielectric properties: (a) low dielectric constant; (b) low dielectric loss; and (c) dielectric constant and loss tangent relatively independent of temperatures.

U.S. Pat. No. 4,358,772 states that for acceptable power transmission efficiency for radome materials, values of less than 10 and 0.01 are required for the dielectric constant and loss tangent respectively. That patent also indicates that ceramic materials such as silicon nitride, alumina, silica, cordierite, mullite and beryllia are suitable radome materials but none alone as a monolithic wall are suitable because none have the combination of a dielectric constant below 10 and a loss tangent of 0.01 and rain erosion and thermal stress resistance. That patent discloses a 5 layer composite consisting of 3 layers of silicon nitride alternating with 2 layers of fused silica. The silicon nitride is relatively pure silicon nitride having been vapor deposited from silicon tetrachloride and ammonia in a hydrogen atmosphere. The silicon nitride layers are disclosed to have a dielectric constant of 6 and a loss tangent of $9 \times 10^{-3}$.

Materials having excellent properties at high temperature such as thermal shock resistance, mechanical strength, etc., are more desirable for high temperature and/or high power window applications. Silicon nitride materials have high mechanical strength at room temperature and high temperatures, and also have excellent thermal shock resistance. However, it is difficult to sinter silicon nitride to high density without using sintering aids. Furthermore, sintering aids play a major role in the overall dielectric properties of silicon nitrides. Thus, the development and discovery of low dielectric loss intergranular phases and/or modification of bulk crystalline properties are very important to obtain good dielectric materials. Usually the dielectric properties of silicon nitrides (hot pressed, reaction bonded and pressureless sintered) are dielectric constants ranging from about 7.5 to about 9 and dielectric loss tangents higher than about 0.001, more particularly from about 0.002 to about 0.02. The dielectric loss tangent is usually highly dependent on temperature. Materials with high loss and adverse temperature dependent properties are not desirable for electromagnetic window applications. Silicon nitride type materials consisting essentially of silicon nitride and yttria and alumina as sintering aids are discussed in "Pressureless Sintered Silicon Nitride as a Promising Candidate for Radome Materials", 17th Symposium on Eletromagnetic Windows, Atlanta Ga., July 25-27, 1984, by M. Y. Hsieh, H. Mizuhara and P. W. Smith. These materials are designated in that article as SNW-1000. Those materials were shown to have properties suitable for high temperature radome applications. Materials which have even lower dielectric constant and lower loss tangent and remain essentially unchanged through the temperature range of from about 25° C. to about 1100° C. would be an advancement in the art.

SUMMARY OF THE INVENTION

In accordance with one aspect of this invention, there is provided a composition having low dielectric constant and low dielectric loss tangent. The composition comprises a silicon nitride based material, an effective amount of a sintering aid selected from aluminum oxide, lanthanum oxide, yttrium oxide, yttrium aluminate, lanthanum aluminate and mixtures thereof and an effective amount of a low dielectric loss promoter.

DETAILED DESCRIPTION OF THE PRESENT INVENTION

For a better understanding of the present invention, together with other and further objects, advantages, and capabilities thereof, reference is made to the following disclosure and appended claims in connection with the foregoing description of some of the aspects of the invention.

The composition of this invention is a silicon nitride based material wherein selected sintering aids are added in a sufficient quantity to achieve a sintered density of greater than about 96% of theoretical. High density samples of 99% or above of theoretical density are desirable in terms of evaluating the "true" dielectric properties. Porosity in samples will reduce the dielectric constant and dielectric loss tangent. This is the reason why some of the published data show low dielectric constants, compared with dense bodies. This gives a false impression of low dielectric constants of various materials including reaction bonded silicon nitride. Furthermore, high density samples have better mechanical strength, wearing properties and reliability.

Slightly porous materials may be desirable for some applications where thermal insulation is desired. In this respect, low contents of sintering aids, such as 4% to 8% (by weight), are acceptable depending on specific applications. The properties of a sintered body vary as sintering aids are reduced. Some trends are as follows: the density and dielectric constant drop, as do, generally, mechanical strength, hardness and wearing properties.

Suitable sintering aids are lanthanum oxide, yttrium oxide, aluminum oxide, lanthanum aluminate, yttrium aluminate, and mixtures thereof. An amount of sintering aid is used which will achieve a density of at least about 96% of theoretical. Amounts of sintering aids ranging from about 3% by weight to about 20% by weight are effective; however, from about 4% to about 16% by weight are preferred. It is preferred to use lanthanum aluminate as the source of lanthanum oxide because lanthanum oxide is hygroscopic. If additional aluminum oxide is desired then aluminum oxide can be added. A mixture of about 8% by weight of lanthanum aluminate and about 8% aluminum oxide is especially preferred as a sintering aid.

The additive that is used as a low dielectric loss promoter is selected from the group consisting of iron, chromium, nickel, cobalt, titanium, zirconium, vanadium, tin and mixtures and compounds thereof. Relatively small amounts, such as 0.05%, can be effective to reduce the dielectric loss tangent. However, it is generally preferred to use from about 0.1% to about 2% by weight.

In the following tables, Samples 31 through 40 contained 12 weight percent lanthanaum aluminate as a sintering aid plus the indicated amount of low dielectric loss promoter, the balance being silicon nitride. Samples 41 through 50 contained 2 weight percent aluminum oxide and 13 weight percent yttrium oxide as sintering aids plus the indicated amount of low dielectric loss promoter, the balance being silicon nitride.

Samples 31–50 were prepared by dry ball milling the appropriate amounts of materials in a Scott-Murray mill. About a 400 gram charge was used with about sixteen kilograms of silicon nitride 1" diameter grinding media. The materials were milled for about 36 hours. After milling, six samples for testing were prepared by pressing into rectangular bars using about 20,000 psi. The bars were then sintered at about 1760° C. for about 4 hours in one atmosphere of nitrogen gas. All samples were above about 99% of the theoretical density.

Table I shows the dielectric properties of Samples 31–40 at 9.375 gigahertz and at four temperatures from 26° to 1100° C. Table II shows the same for Samples 41–50.

TABLE I

| Sample | Promoter | Temp °C. | Dielectric Const. | Loss Tangent |
|---|---|---|---|---|
| 31 | 0.25% NiO | 26 | 7.70 | 0.0008 |
|  |  | 400 | 7.70 | 0.0008 |
|  |  | 800 | 7.74 | 0.0008 |
|  |  | 1100 | 7.81 | 0.001 |
| 32 | 1% NiO | 26 | 7.33 | 0.0008 |
|  |  | 400 | 7.33 | 0.0008 |
|  |  | 800 | 7.36 | 0.0009 |
|  |  | 1100 | 7.41 | 0.001 |
| 33 | 2% NiO | 26 | 7.30 | 0.0008 |
|  |  | 400 | 7.31 | 0.0009 |
|  |  | 800 | 7.35 | 0.0009 |
|  |  | 1100 | 7.38 | 0.0009 |
| 35 | 1% $Co_2O_3$ | 26 | 7.38 | 0.0008 |
|  |  | 400 | 7.38 | 0.0008 |
|  |  | 800 | 7.42 | 0.0009 |
|  |  | 1100 | 7.47 | 0.001 |
| 36 | 2% $Co_2O_3$ | 26 | 7.57 | 0.0007 |
|  |  | 400 | 7.57 | 0.0008 |
|  |  | 800 | 7.61 | 0.0009 |
|  |  | 1100 | 7.67 | 0.001 |
| 37 | 0.25% $TiO_2$ | 26 | 7.50 | 0.002 |
|  |  | 400 | 7.50 | 0.002 |
|  |  | 800 | 7.53 | 0.003 |
|  |  | 1100 | 7.58 | 0.003 |
| 38 | 0.25% $ZrO_2$ | 26 | 7.38 | 0.002 |
|  |  | 400 | 7.39 | 0.002 |
|  |  | 800 | 7.43 | 0.002 |
|  |  | 1100 | 7.46 | 0.003 |
| 39 | 0.25% $V_2O_5$ | 26 | 7.53 | 0.002 |
|  |  | 400 | 7.54 | 0.002 |
|  |  | 800 | 7.58 | 0.003 |
|  |  | 1100 | 7.60 | 0.004 |
| 40 | 0.25% SnO | 26 | 7.40 | 0.001 |
|  |  | 400 | 7.40 | 0.001 |
|  |  | 800 | 7.43 | 0.001 |
|  |  | 1100 | 7.47 | 0.003 |

TABLE II

| Sample | Promoter | Temp °C. | Dielectric Const. | Loss Tangent |
|---|---|---|---|---|
| 41 | 0.25% NiO | 26 | 7.63 | 0.001 |
|  |  | 400 | 7.64 | 0.002 |
|  |  | 800 | 7.65 | 0.002 |
|  |  | 1100 | 7.69 | 0.003 |
| 42 | 1% NiO | 26 | 7.82 | 0.0008 |
|  |  | 400 | 7.82 | 0.0008 |
|  |  | 800 | 7.86 | 0.0009 |
|  |  | 1100 | 7.91 | 0.001 |
| 43 | 2% NiO | 26 | 7.80 | 0.0007 |
|  |  | 400 | 7.80 | 0.0007 |
|  |  | 800 | 7.82 | 0.0008 |
|  |  | 1100 | 7.86 | 0.0009 |
| 44 | 0.25% $Co_2O_3$ | 26 | 7.62 | 0.0008 |
|  |  | 400 | 7.62 | 0.0008 |
|  |  | 800 | 7.63 | 0.0008 |
|  |  | 1100 | 7.69 | 0.001 |
| 45 | 1% $Co_2O_3$ | 26 | 7.96 | 0.0008 |
|  |  | 400 | 7.96 | 0.0008 |
|  |  | 800 | 7.99 | 0.0008 |
|  |  | 1100 | 8.05 | 0.001 |
| 46 | 2% $Co_2O_3$ | 26 | 7.82 | 0.0008 |
|  |  | 400 | 7.82 | 0.0008 |
|  |  | 800 | 7.85 | 0.0009 |
|  |  | 1100 | 7.88 | 0.001 |
| 47 | 0.25% $TiO_2$ | 36 | 7.48 | 0.0007 |
|  |  | 400 | 7.48 | 0.0007 |
|  |  | 800 | 7.51 | 0.0008 |
|  |  | 1100 | 7.54 | 0.0009 |
| 48 | 0.25% $ZrO_2$ | 26 | 7.38 | 0.0007 |
|  |  | 400 | 7.38 | 0.0007 |
|  |  | 800 | 7.41 | 0.0009 |
|  |  | 1100 | 7.44 | 0.001 |
| 49 | 0.25% $V_2O_5$ | 26 | 7.62 | 0.0009 |
|  |  | 400 | 7.62 | 0.0009 |
|  |  | 800 | 7.66 | 0.001 |
|  |  | 1100 | 7.70 | 0.001 |
| 50 | 0.25% SnO | 26 | 7.35 | 0.0008 |
|  |  | 400 | 7.35 | 0.0008 |
|  |  | 800 | 7.38 | 0.0009 |
|  |  | 1100 | 7.42 | 0.0009 |

In contrast to the above, the loss tangent for silicon nitride containing 12 weight percent lanthanum aluminate as a sintering aid, but without a low dielectric loss promoter, was 0.086, almost two orders of magnitude greater than the results shown in Tables I and II.

It can be seen that all the samples in Tables I and II varied less than 2% in dielectric constant over the wide temperature range from ambient to 1100° C. Such a low variation is especially desirable in high power electromagnetic window applications.

What is claimed is:

1. A sintered silicon nitride based ceramic dielectric of at least about 99% theoretical density suitable for use in high temperature radome applications and which consists of a sintering aid, a low dielectric loss promoter and the balance silicon nitride, containing from about 4% by weight to about 16% by weight of a sintering aid used to achieve said theoretical density, said sintering aid being selected from the group consisting of lanthanum oxide, yttrium oxide, aluminum oxide, lanthanum aluminate, yttrium aluminate and mixtures thereof, said ceramic improved by the presence therein of a low dielectric loss promoter at a level of from about 0.1% to about 2% by weight, said low dielectric loss promoter being selected from the group consisting of an oxide of nickel, cobalt, titanium, zirconium, vanadium, tin and mixtures and compounds thereof, said low dielectric loss promoter being effective to provide a low dielectric constant and a low loss tangent that remains essentially unchanged through the temperature range of from about 25° C. to about 1100° C., the dielectric constant being below about 8.0 of about 9.375 gigahertz throughout said temperature range, the loss tangent being less than about 0.003 throughout said temperature range.

2. A radome window of a dielectric material comprising a sintered silicon nitride based ceramic dielectric of at least about 99% theoretical density which consists of a sintering aid, a low dielectric loss promoter and the balance silicon nitride, containing from about 4% by weight to about 16% by weight of a sintering aid used to achieve said theoretical density, said sintering aid being selected from the group consisting of lanthanum oxide, yttrium oxide, aluminum oxide, lanthanum aluminate, yttrium aluminate and mixtures thereof, said ceramic improved by the presence therein of a low dielectric loss promoter at a level of from about 0.1% to about 2% by weight, said low dielectric loss promoter being selected from the group consisting of an oxide of nickel, cobalt, titanium, zirconium, vanadium, tin and mixtures and compounds thereof, said low dielectric loss promoter being effective to provide a low dielectric constant and a low loss tangent that remains essentially unchanged through the temperature range of from about 25° C. to about 1100° C., the dielectric constant being below about 8.0 at about 9.375 gigahertz throughout said temperature range, the loss tangent being less than about 0.003 throughout said temperature range.

* * * * *